Figure 1:
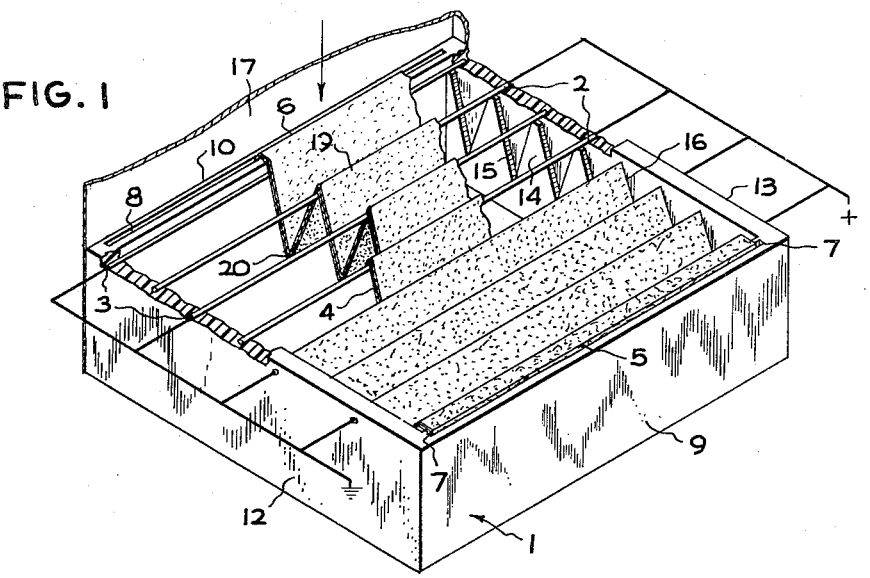

Nov. 26, 1957     J. H. POWERS     2,814,355
ELECTROSTATIC GAS FILTER
Filed Sept. 14, 1955

INVENTOR.
JAMES H. POWERS
BY
HIS ATTORNEY

United States Patent Office 2,814,355
Patented Nov. 26, 1957

2,814,355

ELECTROSTATIC GAS FILTER

James H. Powers, Anchorage, Ky., assignor to General Electric Company, a corporation of New York Application September 14, 1955, Serial No. 534,250

4 Claims. (Cl. 183—7)

The present invention relates to an electrostatic gas filter and is more particularly concerned with a compact, low-cost and low voltage electrostatic filter particularly adapted for household use such as in combination with room air conditioners.

Various devices have been used or proposed for the electrostatic cleaning of gas streams. The operation of all of them depends upon or requires the use of spaced electrodes, the impressing of high ionizing voltages between the electrodes to create an electrical field, and the passing of the dust or particle laden gas stream through the field whereby the particles are charged so that they gravitate to oppositely charged surfaces and are deposited thereon. In one form of known apparatus for precipitating particles from a gas stream, there are employed high voltage ionizing or charging electrodes in the form of fine wires and grounded collecting electrodes in the form of plates extending longitudinally along the path of the gas stream. Since the collecting electrodes must be of sufficient length to be contacted by the deflected particle before it is swept through the precipitator by the velocity of the gas stream, electrostatic gas cleaners of this type have been rather bulky. Furthermore, they involve the problem of periodic removal of the dust from the surfaces of the collecting electrodes which are usually coated with an adhesive coating of oil or the like. Another known type of electrostatic gas cleaner, designed to avoid the problem of periodically removing the precipitated material from the collecting electrode, comprises upstream and downstream electrodes and a porous dielectric or insulating filter media interposed between the electrodes within the electric field. Gas-borne particles which become charged by the upstream electrode are attracted toward the second electrode and become lodged on the surfaces of the filter media.

While this type of filter does not require the periodic cleaning of a collecting electrode since the filter can be replaced directly with a new filter, it is nevertheless somewhat bulky due to the required spacing between the electrodes of opposite polarity and the fact that space must be provided for the filter media between the upstream and downstream electrodes. Furthermore, since the dielectric filter must be in substantial contact with both electrodes or have its surfaces in close proximity to the electrodes, the changing of the filter media has not been very convenient.

It is a primary object of the present invention to provide an improved electrostatic gas cleaner of compact and low-cost construction.

Another object of the invention is to provide an improved electrostatic gas cleaner including an inexpensive, easily replaceable filter media.

A further object of the invention is to provide an electrostatic cleaner including a filter media which can be removed and replaced without disturbing or disassembling the electrodes or their supporting frame.

Another object of the invention is to provide an electrostatic gas cleaner including electrode-shielding portions of the filter media disposed on the upstream side of the electrodes to eliminate the need for periodic cleaning of the electrodes.

Further objects and advantages of the invention will become apparent as the following description proceeds, and the features of novelty which characterize the invention will be pointed out with particularity in the claims annexed to and forming a part of this specification.

In accordance with the present invention, there is provided an electrostatic filter for filtering particles from a gas stream comprising a plurality of wire or rod-like electrodes which are arranged substantially parallel to each other and are disposed in a plane extending laterally across the gas stream. Adjacent rods are charged at different potentials thereby creating an electric field whose maximum intensity is in the plane of the electrodes or, in other words, in a plane lateral to the path of the gas stream. An accordion-folded or zig-zag folded filter media of dielectric fibrous material is disposed with ridges thereof on the upstream side of the electrodes and supported by or positioned closely to the electrodes.

Figure 2:
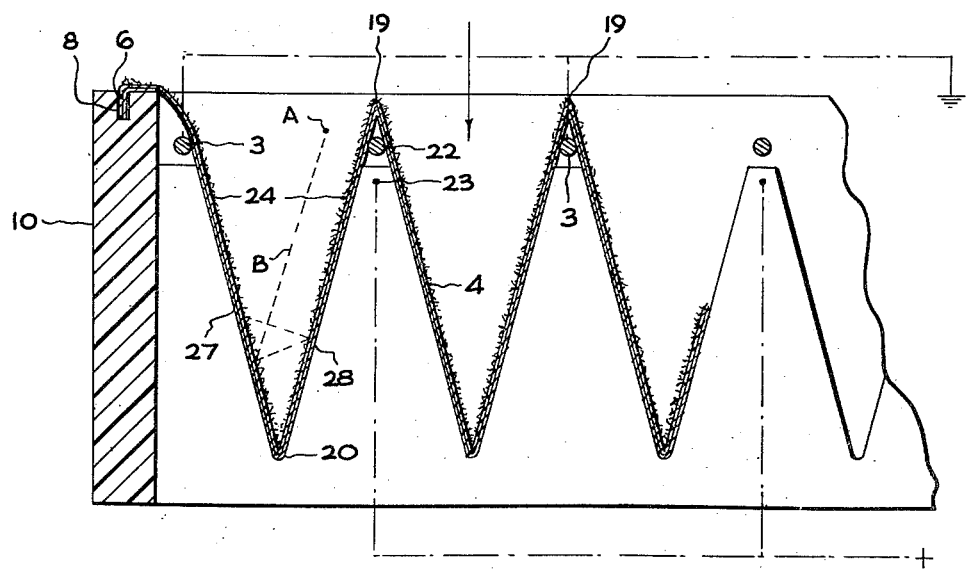

For a better understanding of the invention, reference may be had to the accompanying drawing in which Fig. 1 is a partial perspective view of one embodiment of the present invention with portions of the filter media broken away to show the remaining structure of the filter; and Fig. 2 is a partial sectional view of another modification of the invention.

In Fig. 1 of the drawing there is shown a modification of the electrostatic gas filter of the present invention comprising an insulating frame member 1 which supports a plurality of elongated electrodes in parallel relationship. The electrode arrangement comprises a first series of electrodes 2 and a second series of electrodes 3 which in operation of the device are maintained at a different potential than the electrodes 2. The electrodes of the series 2 and 3 are arranged alternately on the supporting frame 1 in parallel relationship and are disposed in substantially the same plane. One set or series of electrodes, such as the electrodes 2, are charged with a high voltage while the other set 3 is grounded. By this arrangement in which the adjacent electrodes in the coplanar electrode arrangement are of different potentials, there is created an electric field having its highest potential in or across the plane of the electrodes.

A dielectric filter media 4 comprising one or more sheets of fibrous material folded into an accordion or zig-zag form is at least partially supported by the electrodes and is arranged to fill the entire internal area within the frame 1. The filter media 4 comprises one or preferably more than one sheet of paper and the ends 5 and 6 of the filter sheets are anchored by insertion into suitable slots 7 and 8 in the frame members 9 and 10 parallel to the electrodes. To facilitate the anchoring of the ends 5 and 6 in the cooperating slots, these end portions are preferably stiffened as for example by impregnation with a suitable stiffening agent or by attaching to the end portions a strip of relatively heavy paper or light cardboard.

For the purpose of supporting the side edges of the filter media, the side members 12 and 13 of the frame 1 are provided with a plurality of triangularly-shaped projections 14 with the apex of each projection adjacent and immediately behind one of the electrodes. Each of these projections 14 provides sloping shoulders 15 for receiving the side edges 16 of the filter media and supporting these edges when the filter media 4 is disposed on the frame 1.

The electrostatic gas filter is adapted to be disposed within a gas duct 17, a portion of which is shown in Fig. 1, in such a manner that the gas stream, whose direction of flow is shown by the arrow in Fig. 1, exerts a pressure on the filter media 4 and holds the filter media in contact with the supporting electrodes and shoulders 15. It is not necessary to position the filter in a horizontal position as shown in Fig. 1 as it is equally efficient when disposed in a vertical position with one of the side walls 12 or 13 or one of the end walls 9 or 10 forming the base or supporting wall.

With the filter media 4 arranged on the frame 1 and the electrodes 2 and 3 and the filter disposed in an air duct as shown in Fig. 1, it will be seen that the filter media entirely overlies the electrodes 2 and 3 on the upstream side thereof. In other words, the upstream ridges 19 in the folded filter protect the electrodes from direct contact with the particles in the gas stream while the downstream ridges 20 are disposed behind or downstream from the electrode plane so that the portions of the filter between the ridges are in a position to capture the particles after they have passed through the electrode area.

In the modification of the invention shown in Fig. 2, all of the electrodes do not form the supporting members for the filter media. For the purpose of describing the modification of Fig. 2, the same reference numerals have been used for the same or similar parts. In this modification the grounded electrodes 3 are in direct contact with the upstream ridges of the filter media 4 while the high potential electrodes 23 which serve the same electrical function as the electrodes 2 in the modification of Fig. 1, are disposed somewhat downstream from the upstream ridges of the filter media. The filter media 4 in the area adjacent the electrodes 23 is supported by a rod or wire 22 and the charge on the filter media 4 is that induced by the electrostatic field between the high potential electrodes 23 and the grounded electrodes 3.

In this modification, the high potential electrodes 23 are relatively small in diameter, preferably composed of tungsten wire, for the purpose of further intensifying and increasing the effectiveness of the electrostatic field. Preferably these tungsten wire electrodes 23 are located within about one-eighth of an inch of the supporting members 22 and also the adjacent portions of the filter media.

In the operation of the filter in both embodiments of the present invention, a moderately high charging or ionizing voltage is impressed between the spaced electrodes with the result that there is set up an electrical field having its highest intensity in the plane or substantially in the plane of the electrodes or, in other words, in a plane extending laterally across the path of the gas stream. In addition to this field which is created in the air spaces between the spaced electrodes, the dielectric fibrous material, of which the filter is composed, is also charged. The charge or potential of any particular point on the filter media is dependent upon the relative position of this point with reference to the high potential and grounded electrodes. In other words, there is a potential gradient along the length of the individual folds between adjacent electrodes, the charge being highest adjacent the high voltage electrodes 2 or 23 and gradually decreasing to ground potential at the grounded electrodes 3. With the filter media folded as shown in the two figures, the downstream ridges 20 may be described as having a potential which is about half way between the high potential of the electrodes 2 or 23 and the ground potential of the electrodes 3. In other words, it may be said that the entire fold 27, which is closer to the ground electrode is at a lower potential than the other fold 28 which is closer to the high potential electrode although it is to be understood that there is a gradual decreasing potential gradient from the high voltage electrode 2, in Fig. 1, and the high voltage electrode 23, in Fig. 2, to the grounded electrode 3. As a result of the fact that the various areas of filter media are charged at different potentials, attractive forces are set up between the opposed folds 27 and 28 which cause any unattached particle on one of these folds to be attracted across the space between the folds and onto the other fold where it assumes the charge of the other fold.

The manner in which the filter of the present invention operates to remove suspended dust particles from a moving gas stream can best be illustrated with reference to the cross-sectional view of the modification shown in Fig. 2. As the suspended particles are brought into the high intensity field in the plane of the electrodes by the velocity of the gas stream, each particle is charged at a potential depending upon its position in the field relative to the oppositely charged electrodes. This induced charge causes the particle which is still moving forwardly with the gas stream to be attracted to a point within the filter of opposite potential or charge. For an example, a particle A moving into the filter area at a point adjacent the high potential electrode 23 is given a charge close to that of the electrode 23. The charged particle is thereafter deflected away from the high potential electrode 23 and towards an area or portion of the filter of opposite or lower potential. The path of the particle A may for example follow that generally indicated by the dotted line B to a point on the fold 27. At that point the particle will either become enmeshed or anchored in the fibrous structure of the filter media and permanently held there or it will immediately take on the same potential as that point on the fold 27 and be attracted to the high potential fold 28. If this is the case, the particle in its transition from the fold 27 to the fold 28 will be under the influence of not only the forwardly moving gas stream but also the electrical field within the filter. The moving gas stream tends to force the particle downwardly toward the downstream ridge 20 while the electrical field, which is highest at the upstream portion of the filter, is the stronger of the two and tends to reverse the original direction of travel of the particle so that the particle moves somewhat upwardly towards the higher intensity area. As a result, the particle moves laterally across and somewhat upstream between the fold 27 until it contacts the fold 28 where it assumes the same charge as this point on the fold 28. Here, unless the particle is captured and permanently held on the surface of the filter media or within its fibrous structure, the process is repeated. That is, the particle takes on the same charge as that point on the fold 28 and is thereafter moved somewhat upstream and across between the folds until it again contacts the fold 27.

If it should reach a position upstream from the electrodes, the gas stream forces will sweep it back into the filter.

Thus, it will be seen that the particle is retained within the area of the filter until it becomes permanently lodged on some portion of the filter media.

As has been previously indicated, the particle is suspended in the gas stream or traveling generally at the same or substantially the same velocity as the gas stream. By arranging the grounded and high potential electrodes side by side in a plane extending laterally across the path of the gas stream at the entrance or upstream face of the filter, the particles are subjected to the highest intensity field at the entrance to the filter and are continuously subjected to the field throughout the entire depth of the filter media. This electrical field set up between the electrodes also tends to slow down the particles as they enter the filter area. This is a particular advantage in the filtering of high velocity gas streams as otherwise small particles carried at the high velocity of the gas stream may be carried through the entire electrical field and through the pores of the filter by the force of the gas stream. In other words, this side-by-side arrangement of the high potential and grounded electrodes across the path of the gas stream at the entrance to the filter has a slowing down effect on the particles which could not be obtained, at least not the same degree, if, for example, the high potential electrodes were positioned at a substantial distance upstream from the ground electrodes.

Preferably, the filter media is composed of more than one sheet of filter paper of a loosely matted structure and in which many of the fibers have free or unanchored ends protruding from the base structure of the sheet. These loose or free ends generally indicated by the numeral 24 in Fig. 2 are, of course, charged during operation of the filter and will tend to be attracted towards the opposed folds of the filter so that they arrange themselves substantially perpendicular to the surface of the filter media. In other words, the loose surface fibers on the fold 27 are attracted toward the fold 28 while those on the fold 28 are attracted towards the fold 27 with the result that there is a much greater likelihood of any particle in the gas stream coming into contact with the surfaces of the filter media or becoming entrapped between these upstanding fibers and permanently held within the filter media. A further advantage of using a plurality of sheets of filter paper secured together only along their end or edge portions is that the various folded layers will not lay flat and tight together and the air in its staggered movement between the layers will tend to inflate and open up the clearance between the layers. These spaces between the layers provide pockets which in effect hold the captured dirt particles that have passed through the first or upstream layer of paper. Also, as the pores or holes in each of the layers are randomly positioned and hence do not generally line up with one another the air movement through the superimposed paper layers is not in a straight line and hence the effect of this air movement on the particles will be to deposit the particles permanently on or between the layers or sheets.

The minimum spacing between the high potential and grounded electrodes will depend upon the voltage impressed on the electrodes. For example, if the voltage of the high potential electrodes is 10,000 volts, a minimum spacing of one inch is required to prevent flashover between the electrodes. If the voltage is reduced to 7,500 volts, a spacing of three-quarters inch will be ample. Likewise, there appears to be an optimum relationship between the charging voltage and the total length of the folds 27 and 28 between adjacent charged electrodes. It has been found that particularly for the filtering of high velocity gas streams in room air conditioners and the like, the length of the combined folds 27 and 28 preferably should be from one-fourth to one-half inch per thousand volts differential between the electrodes. In other words, if the impressed voltage is 10,000 volts, the length of filter media between electrodes of opposite polarity should be from about two and one-half to five inches in order to obtain optimum filtering efficiency for a given size filter.

While the filtering media may be made of any of a number of different fibrous materials, it has been found that best results are obtained by the use of a rayon paper or a high rayon content mixture such as a mixture of rayon and hemp. The passage of air through a rayon containing paper appears to set up an electrostatic charge on the paper which further enhances the filtering qualities of the electrostatic filter.

In some cases, where the permissible depth of the filter, that is the distance between the upstream and downstream faces thereof, is limited, additional supports may be provided between adjacent grounded and high potential electrodes and the desired filter area obtained by folding the paper an increased number of times and supporting the added upstream ridges thereof intermediate the ridges supported by the charged electrodes on added supports. Of course, as is the case in any electrostatic field of this type, each of the added supports will assume a charge intermediate that of the adjacent high potential and grounded electrodes and the filter will function in the same manner as that previously described with the increased number of folds in the filter media provides means for increasing the total filter surface area without increasing the depth of the filter.

While there has been shown and described specific embodiments of the invention, it is not desired that the invention be limited to the particular form shown and described, and it is intended by the appended claims to cover all modifications within the spirit and scope of the invention.

What I claim as new and desire to secure by Letters Patent of the United States is:

1. An electrostatic filter for filtering particles from a gas stream comprising a porous dielectric filtering media in sheet form having zig-zag folds therein and disposed across the path of the gas stream with the ridges thereof alternately facing upstream and downstream, a plurality of parallel electrodes disposed closely adjacent and parallel to the upstream ridges of said media, all of said electrodes being on the downstream side of said media with only one of said electrodes disposed in each of said upstream facing ridges, alternate electrodes being connected to a source of high voltage and intermediate electrodes being grounded to provide in the plane of the upstream ridges an ionizing field which tends to counteract and oppose the gas stream velocity of said particles and to deflect said particles laterally against the fold areas of said media.

2. An electrostatic filter for filtering particles from a gas stream comprising a porous dielectric filtering media comprising a plurality of sheets of fibrous material having zig-zag folds therein and superimposed across the path of the gas stream with the ridges thereof alternately facing upstream and downstream, a plurality of parallel wire electrodes disposed within said folds closely adjacent and parallel to the upstream ridges of said media, all of said electrodes being on the downstream side of said media with only one of said electrodes disposed in each of said folds, alternate electrodes being connected to a source of high voltage and intermediate electrodes being ground to charge said filtering media and to provide in the plane of the upstream ridges an ionizing field which charges said particles and deflects said particles laterally against the fold areas of said media.

3. An electrostatic filter for filtering particles from a gas stream comprising a porous dielectric filtering media comprising a plurality of layers of rayon paper having zig-zag folds therein and disposed across the path of the gas stream with the ridges thereof alternately facing upstream and downstream, a plurality of parallel electrodes arranged parallel to and supporting the upstream ridges of said media, all of said electrodes being on the downstream side of said media with only one of said electrodes disposed in each of said upstream facing ridges, alternate electrodes being connected to a source of high voltage and intermediate electrodes being ground to provide in the plane of the upstream ridges an ionizing field which tends to counteract and oppose the gas stream velocity of said particles and to deflect said particles laterally against the downstream areas of said media.

4. An electrostatic filter for filtering particles from a gas stream comprising an accordion-folded filter media of dielectric fibrous material extending across the path of the gas stream with the ridges thereof alternately facing upstream and downstream, a plurality of electrodes disposed in substantially the same plane on the downstream side of said media and closely adjacent the upstream ridges thereof, an electrode disposed in each one of said upstream ridges of said media and being charged at a different potential from electrodes disposed in adjacent upstream ridges of said media and cooperating therewith to establish and maintain electrostatic potential difference between adjacent upstream ridges of said filter media.

References Cited in the file of this patent

UNITED STATES PATENTS

| | | |
|---|---|---|
| 2,297,601 | Williams | Sept. 29, 1942 |
| 2,502,560 | Dahlman | Apr. 4, 1950 |
| 2,735,509 | Fields | Feb. 21, 1956 |